United States Patent [19]

Tonsor et al.

[11] Patent Number: 4,836,318
[45] Date of Patent: Jun. 6, 1989

[54] TRACK ROLLER FRAME ASSEMBLY

[75] Inventors: Andrew J. Tonsor, East Peoria; David E. Nelson, Peoria; James E. Gee, Washington; Samuel B. Stevens, Pekin, all of Ill.

[73] Assignee: Caterpillar Inc., Peoria, Ill.

[21] Appl. No.: 213,744

[22] Filed: Jun. 30, 1988

Related U.S. Application Data

[63] Continuation-in-part of Ser. No. 90,476, Aug. 28, 1987, Pat. No. 4,781,257.

[51] Int. Cl.$^4$ ............................................... B62D 55/00
[52] U.S. Cl. ......................................... 180/9.5; 305/21
[58] Field of Search ..................... 301/21, 22, 24, 27, 301/28, 29, 31, 32, 56, 57; 180/9.5, 9.46, 9.54, 9.58

[56] References Cited

U.S. PATENT DOCUMENTS

| | | | |
|---|---|---|---|
| 1,849,560 | 3/1932 | White | 305/31 |
| 2,670,249 | 2/1954 | Pilch | 305/8 |
| 2,948,347 | 8/1960 | Risk et al. | 180/9.5 |
| 3,872,939 | 3/1975 | Eckert | 180/6.48 |
| 3,899,218 | 8/1975 | Blomstrom | 305/9 |
| 3,910,367 | 10/1975 | Drone et al. | 180/9.5 |
| 3,953,085 | 4/1976 | Randour | 305/16 |
| 3,963,278 | 6/1976 | Gan Wuytswinkel | 305/12 |
| 3,974,891 | 8/1976 | Persson | 180/9.44 |
| 4,241,956 | 12/1980 | Weisel, Jr. | 305/57 X |
| 4,650,259 | 3/1987 | Alexander et al. | 305/10 |
| 4,650,260 | 3/1987 | Satzler | 305/31 |
| 4,739,852 | 4/1988 | Stevens et al. | 305/29 X |
| 4,781,257 | 11/1988 | Gee et al. | 180/9.5 |

FOREIGN PATENT DOCUMENTS 2149731 6/1985 United Kingdom .

OTHER PUBLICATIONS

Caterpillar Inc. Frame Assembly Print 5G8662 (sheet 1) dated Oct. 2, 1986.

Primary Examiner—James B. Marbert
Assistant Examiner—Russell D. Stormer
Attorney, Agent, or Firm—Charles E. Lanchantin, Jr.

[57] ABSTRACT

A track roller frame assembly for a track-type vehicle includes a rugged and yet lightweight main body including a channel-shaped base, a recoil-mechanism receiving tubular casing overlyingly connected to a first end portion of the base, and a plate structure overlyingly connected to the second end portion of the base. A collar defines a bore therethrough for receiving a support member of a drive wheel preferably containing a hydraulic drive motor, and a support bracket is connected to the tubular casing for pivotally connecting the main body to the main frame of the vehicle. The weight of the superstructure and the tension forces on the drive belt that encircles the track roller frame assembly are advantageously transferred through the collar and the main body along a central vertical plane therealong and to a plurality of roller wheels centrally supported under the base. Several embodiments of the plate structure and the channel-shaped base are illustrated which collectively define a tubular beam having a particularly efficacious height "h" to width "b" relationship and a back-up shoulder for strengthened connection with the tubular casing.

23 Claims, 11 Drawing Sheets

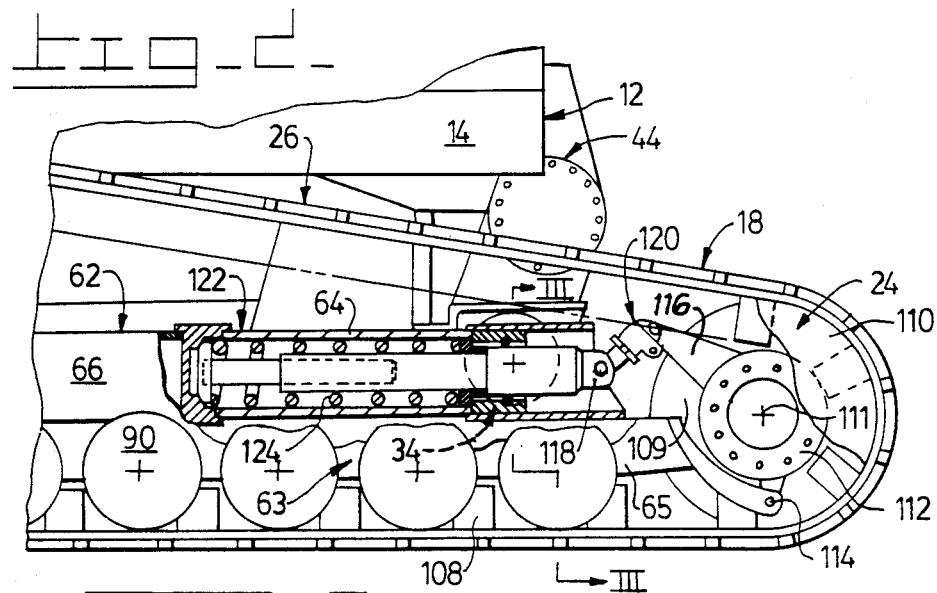
Fig_2_
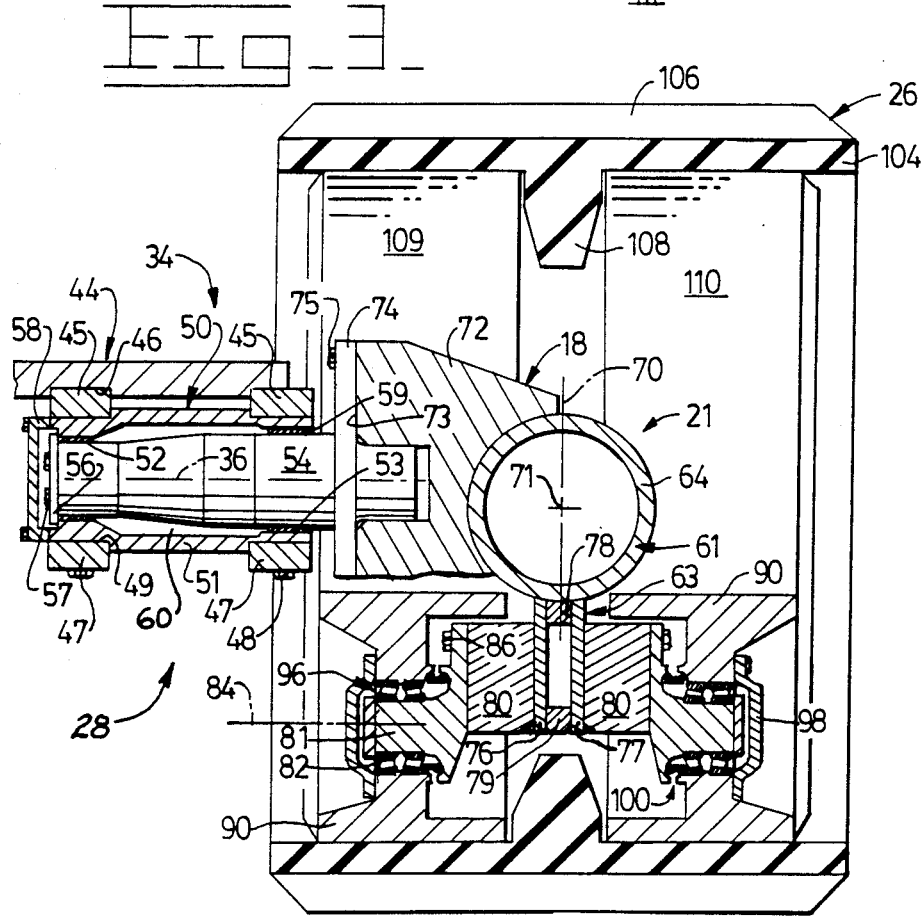
Fig_3_

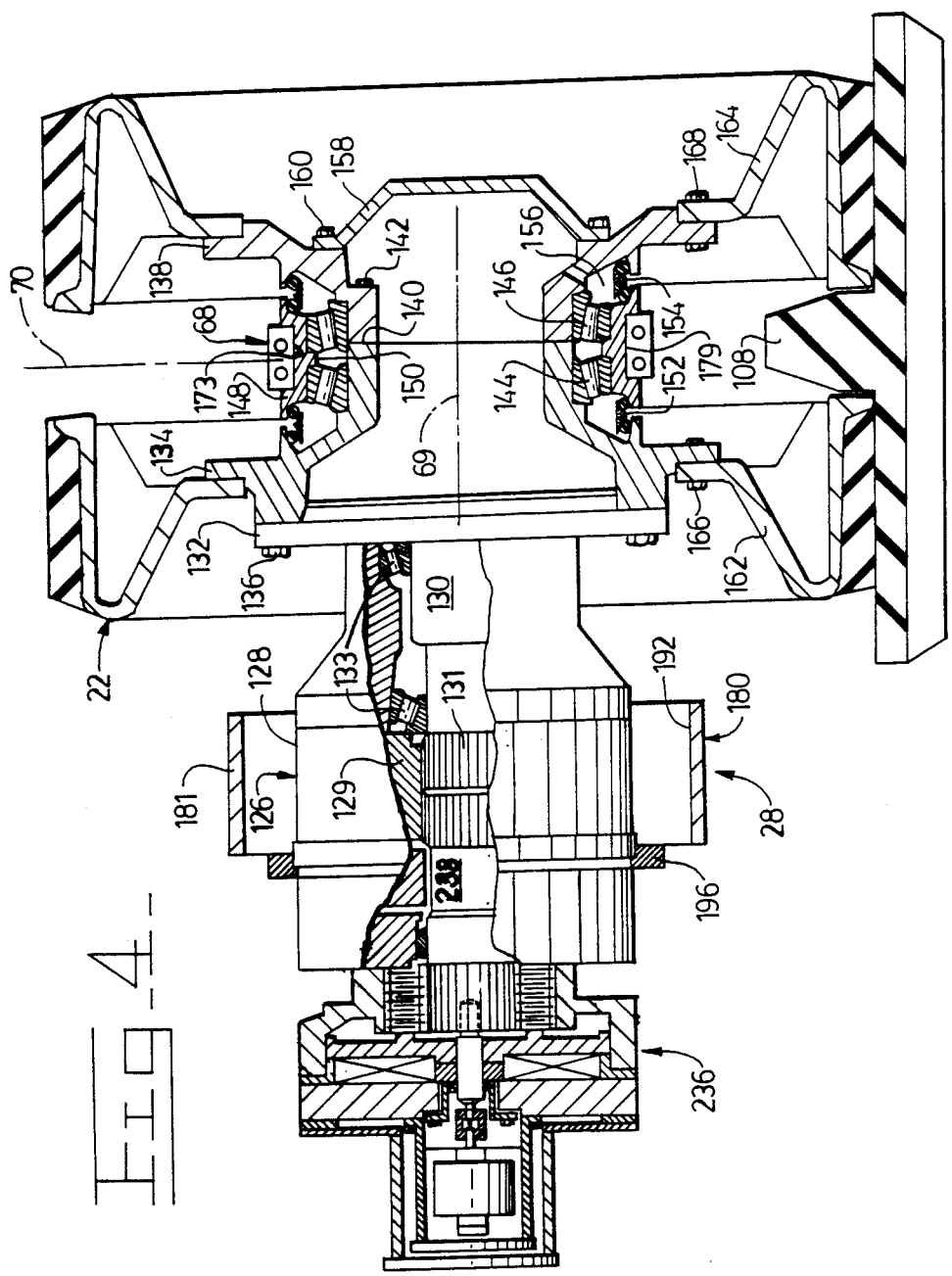

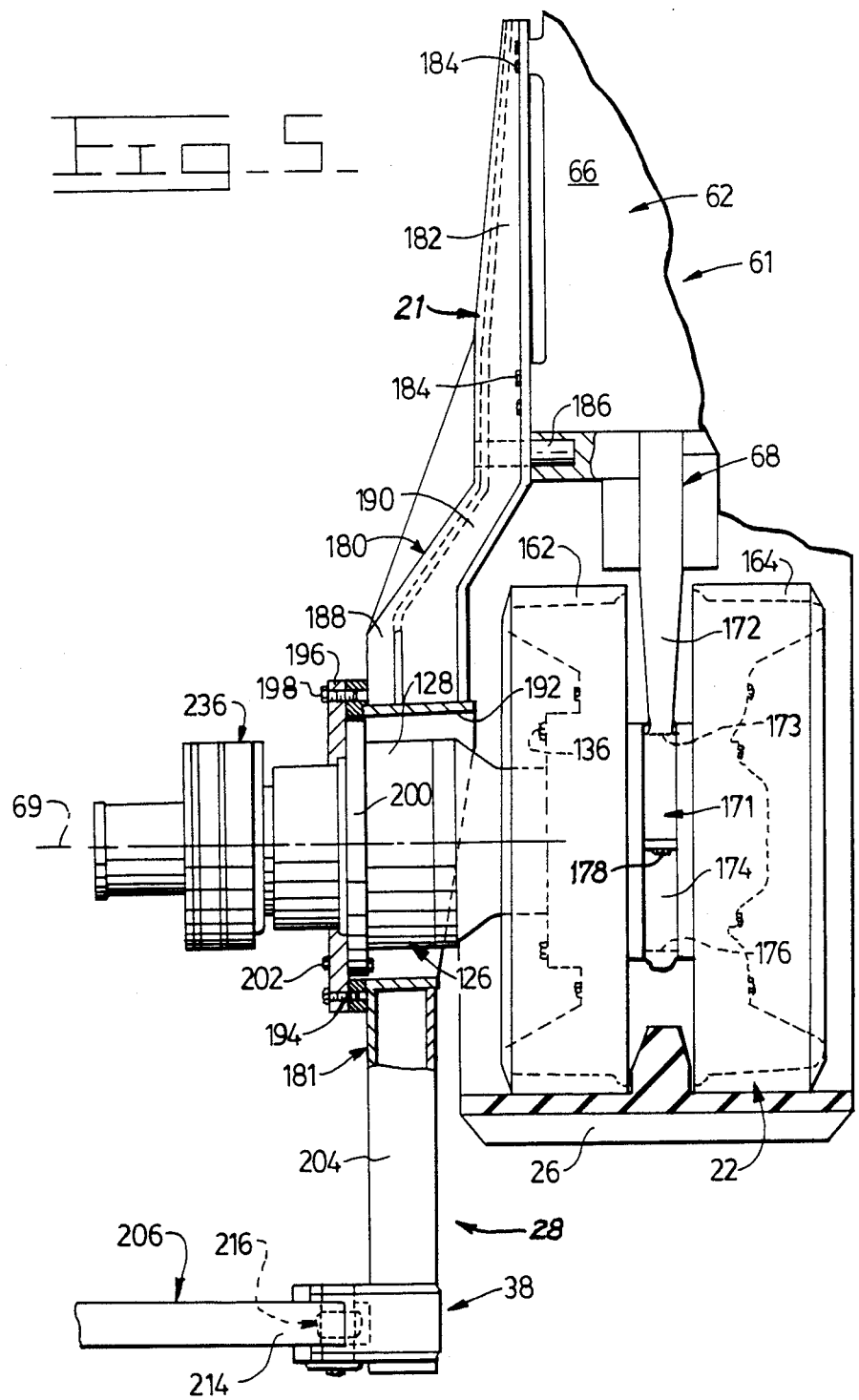

Fig_6_
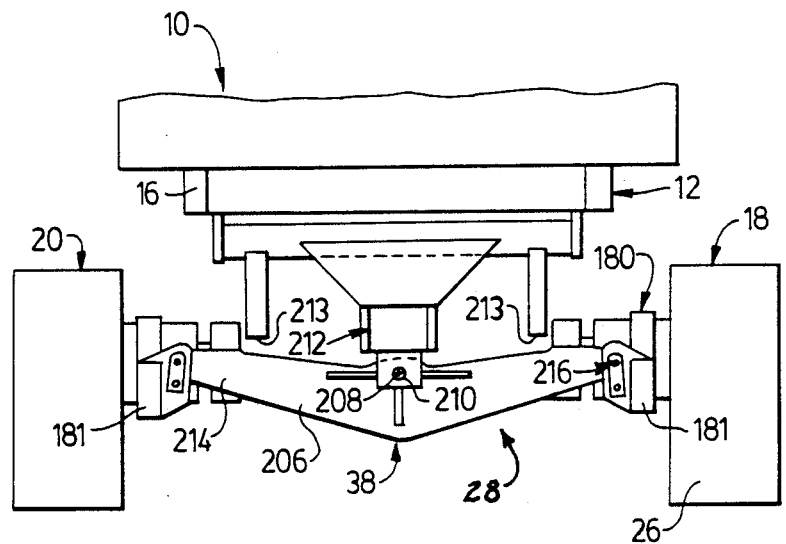

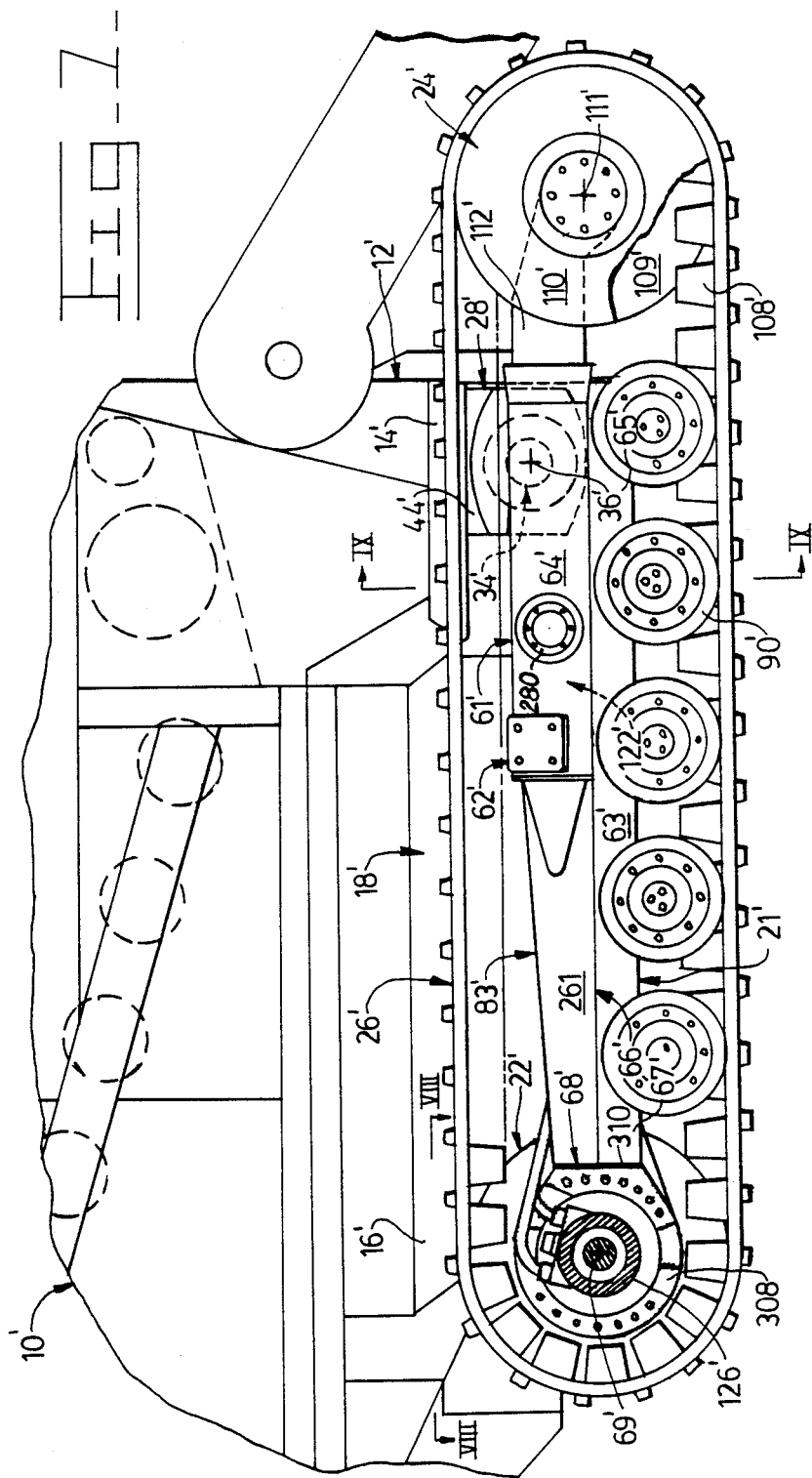

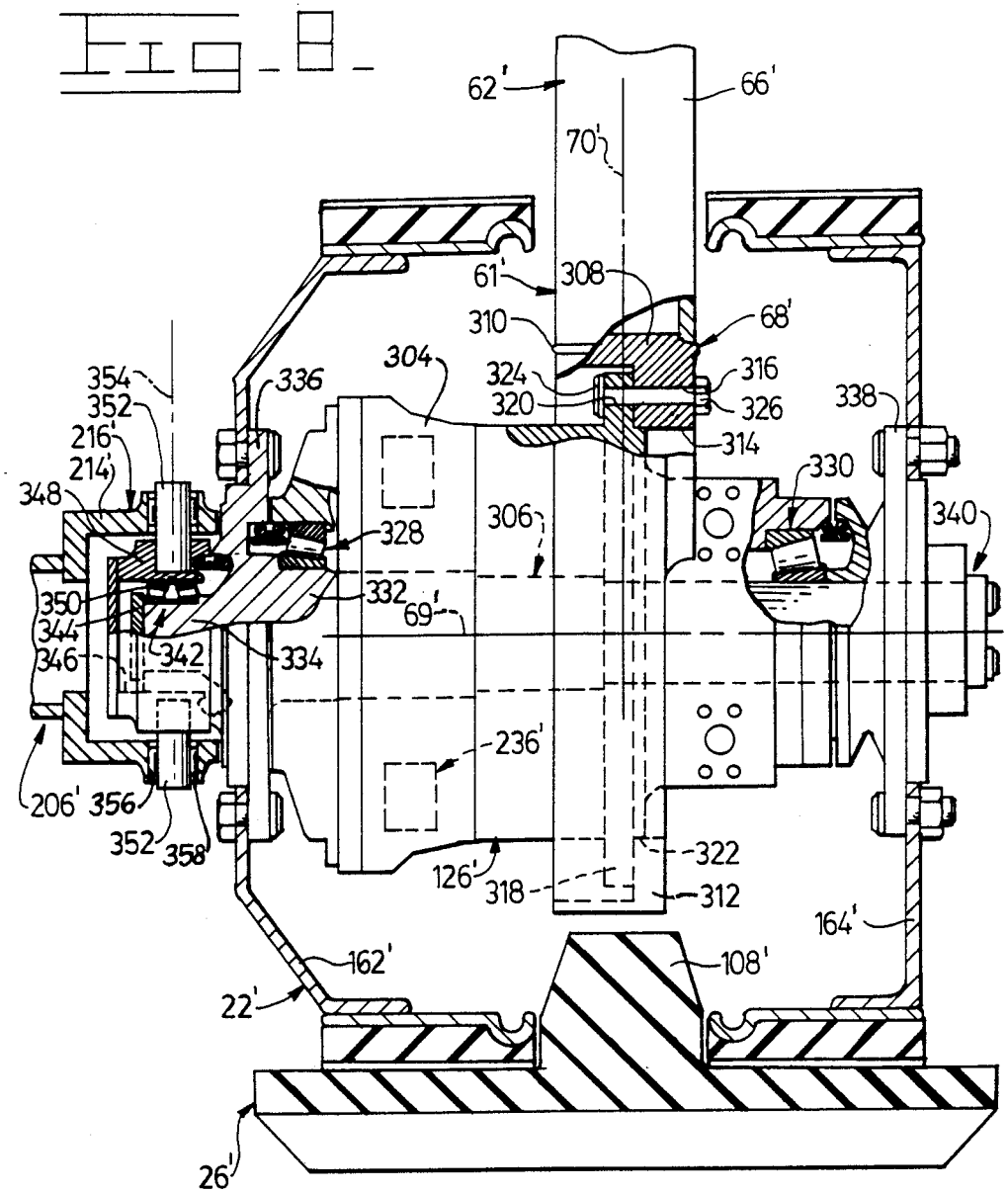

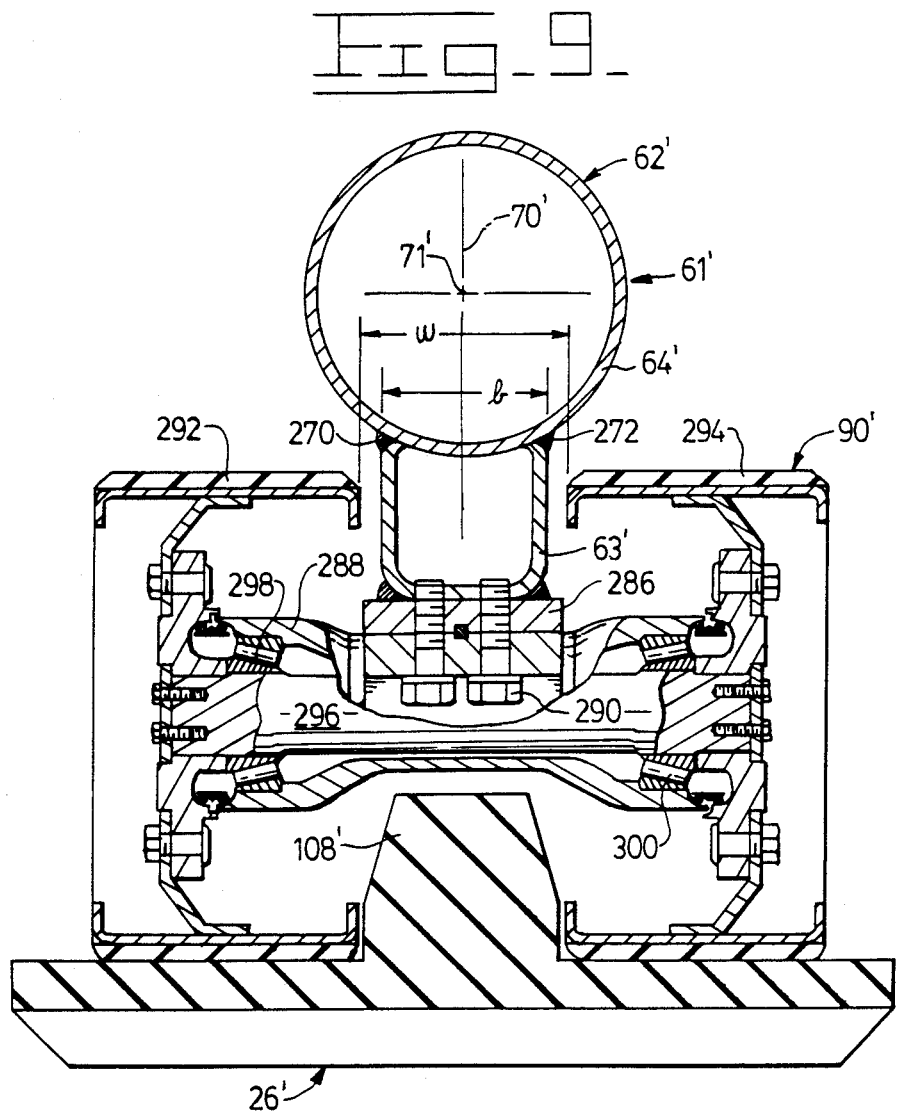

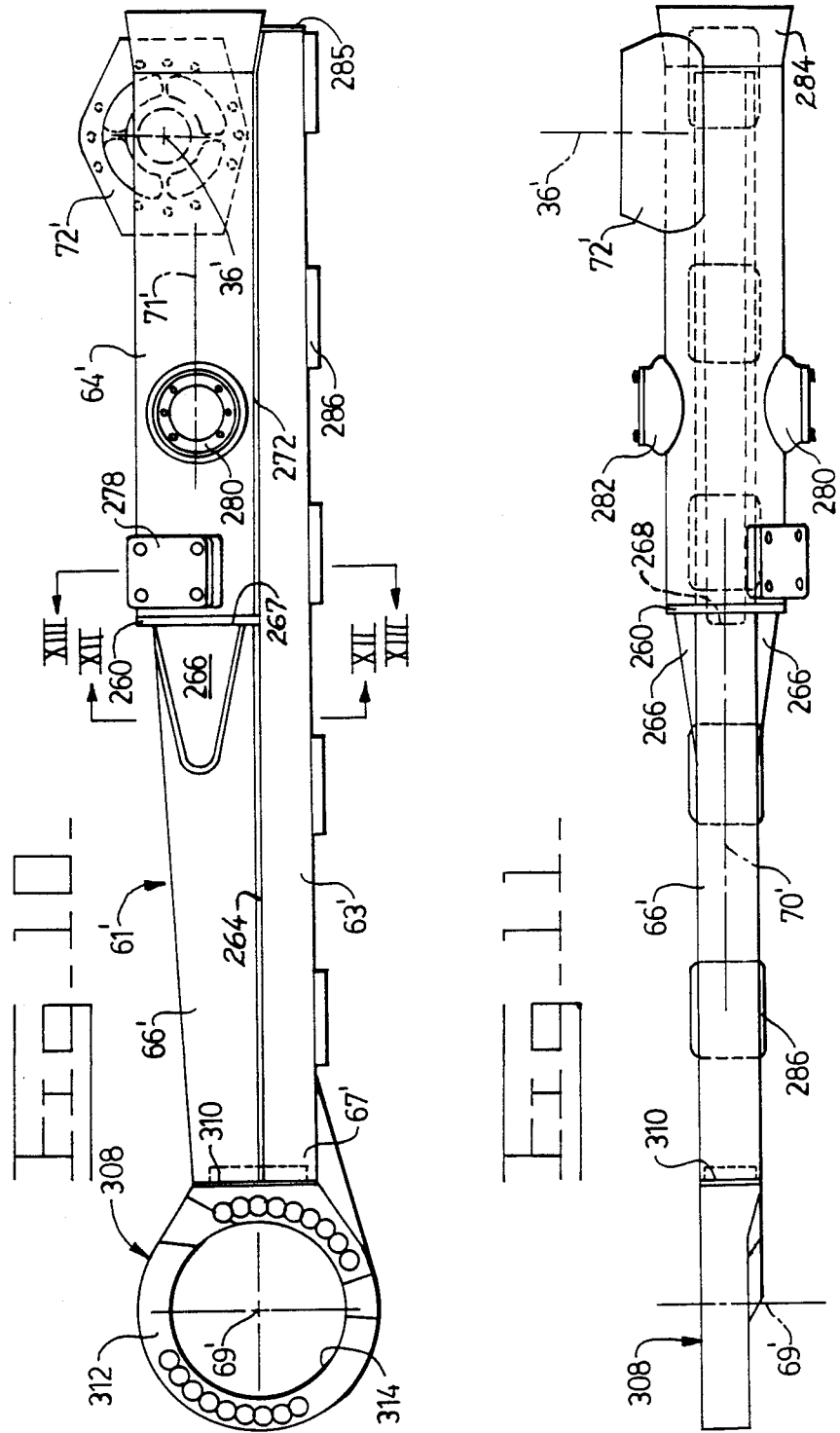

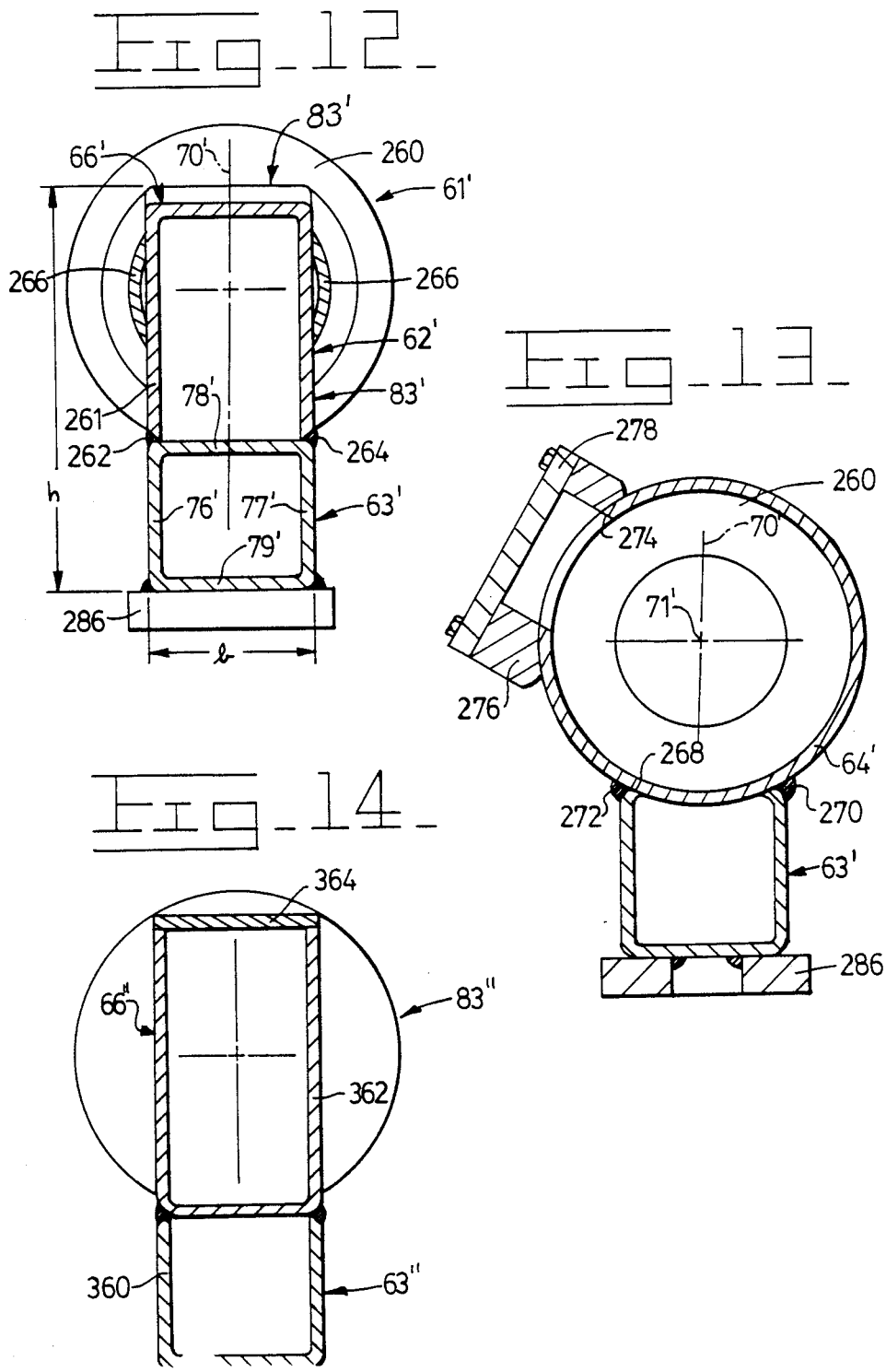

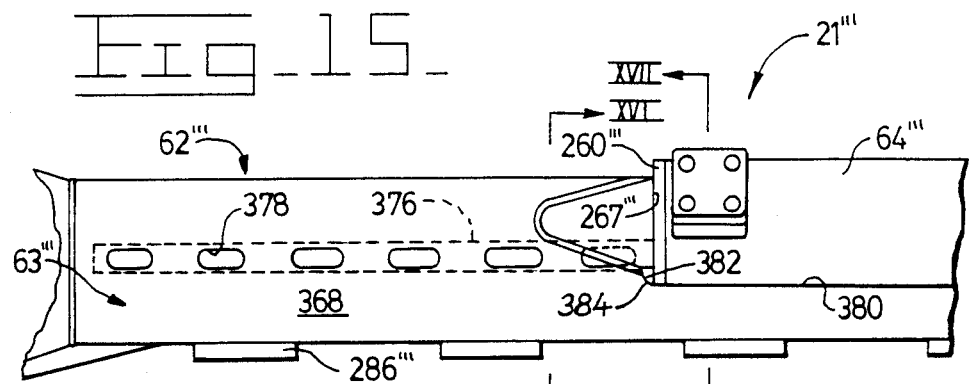
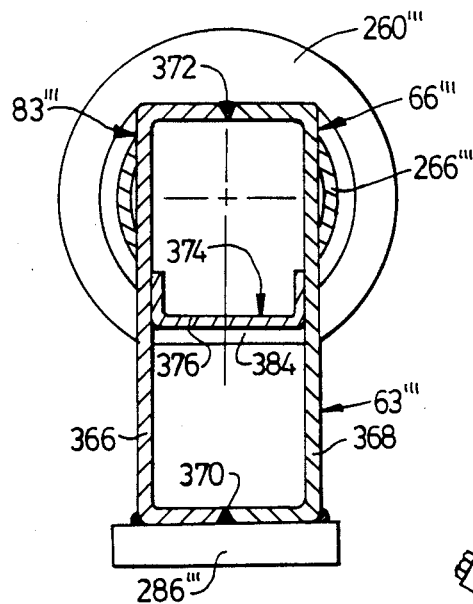
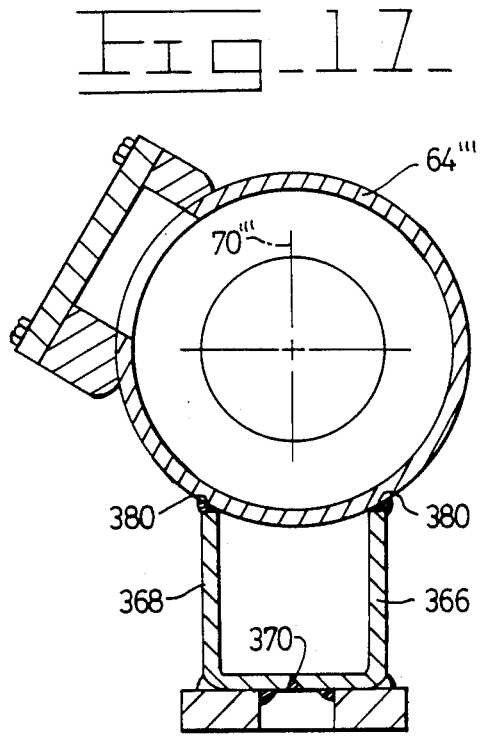

TRACK ROLLER FRAME ASSEMBLY

CROSS-REFERENCE TO RELATED APPLICATION

This is a continuation-in-part application under U.S.C. 120 of pending prior Application Ser. No. 90,476, now U.S. Pat. No. 4,781,257, filed on Aug. 28, 1987 by James E. Gee, et al for "Suspension Structure for a Tracked Vehicle".

1. Technical Field

This invention relates generally to a tracked vehicle such as a combine harvester, earthmoving machine or the like, and more particularly to the lightweight, yet rugged construction of a track roller frame assembly therefor.

2. Background Art

Most track-type vehicles or crawler tractors have two track roller frame assemblies which are pivotally mounted on aligned shafts secured to the rear of the main frame and which are adapted to limitedly swing in vertical, longitudinally oriented planes. Oscillation of the track roller frame assemblies is desirable to accommodate surface irregularities and to reduce shock loads, and the front portions thereof are often interconnected by an equalizer bar or generally equivalent leaf spring assembly which is centrally connected to the main frame. Exemplifying the art in this area are: U.S. Pat. Nos. 2,670,249 issued to J. S. Pilch on Feb. 23, 1954; 3,899,218 issued to G. D. Blomstrom, et al on Aug. 12, 1975; 3,974,891 issued Aug. 17, 1976 to J. E. Persson; and 4,650,260 issued March 17, 1987 to R. L. Satzler.

Historically, the track roller frame assemblies have been mounted on the main frame for pivotal movement about the transverse axis of the driven rear sprocket wheels. But, it has been found that when large implement forces are imposed on the bearings of the sprocket wheels, such as are encountered when using a bulldozer blade, there is a marked decrease in the surface life of the bearings and associated elements. Accordingly, the track roller frame assemblies have often been pivoted on fixed shafts connected to the main frame and which are located forwardly of the sprocket wheels so that operating forces on the track roller frame assemblies and on the implement can be directed thereto independent of the sprocket wheels. In either case, the equalizer bar is supported on the front portions of the track roller frame assemblies.

United Kingdom Patent Application No. 2,149,731A filed on Nov. 17, 1983 by A. Terai, et al, and published June 19, 1985, discloses two track roller frame assemblies that are individually pivotally mounted on a fixed rear shaft structure, that are also connected to the main frame by a forwardly disposed equalizer bar, and that individually incorporate a hydraulic drive motor on the inboard side of each sprocket wheel and a reduction gear unit on the outboard side of each sprocket wheel. In that construction each track roller frame assembly is of the usual double rail type which is characterized as being heavy, complex, and costly to manufacture.

U.S. Pat. Nos. 3,872,939 issued to H. L. Eckert on March 25, 1975; 3,899,218 mentioned above; and 3,963,278 issued to C. M. G. VanWuytswinkel on June 15, 1976 typify the double-rail track roller frame construction that has been used successfully for many years. In said construction the superstructure loads are transmitted through the inboard and outboard rails to the opposite ends of plurality of track roller shafts and to the supporting roller wheels. But these heavy frames are difficult to manufacture and too expensive.

One other track roller frame assembly produced by the Assignee of the present invention deviated from the usual double rail form by utilizing a longitudinally oriented, vertical steel plate for the primary body portion thereof. This thick and overly heavy plate was notched at the top to receive the tubular casing for the usual recoil mechanism, and was triangularly notched at the bottom to receive a corresponding plurality of laterally thick mounting brackets for the roller wheels. The roller frame was pivotally secured to the main frame by a collar connected to the rear of the plate, and also by an undesirable diagonal brace secured to the main frame laterally inwardly of the collar on the same axis.

Therefore, what is desired is a track roller frame assembly that is rugged and reliable, and yet is of a light weight and economical structure. For example, such assembly should have a relatively limited number of major portions which are easy to assemble and connect to each other.

The present invention is directed to overcoming one or more of the above problems.

DISCLOSURE OF THE INVENTION

In one aspect of the invention there is provided a track roller frame assembly which is connectable to a vehicle main frame and is defined by a main body including an elongate channel-shaped base adapted to be supported by a plurality of roller wheels. A tubular casing is overlyingly connected to a first end portion of the base, plate means is overlyingly connected to a second end portion of the base for forming a tubular beam of increased depth thereat and a back-up shoulder for a strengthened connection with the tubular casing, and a collar connected to the tubular beam and defining a transverse opening therethrough.

In accordance with another aspect of the invention there is provided a track roller frame assembly of the type which is connectable to a vehicle main frame and which is adapted to be supported by a plurality of roller wheels, and that includes a main body having a channel-shaped base having first and second end portions, a tubular casing overlyingly connected to the first end portion, and a transition plate structure overlyingly connected to the second end portion. And, further, a wheel-supporting collar is provided which is connected to the main body at the second end portion of the base which defines a bore therethrough.

What is provided is a track roller frame assembly that is very strong, and yet it is of a lightweight and economical structure. The major portions thereof are limited in number and easy to connect to each other by a minimum of simple elongate weld joints. Also, the weight of the vehicle's superstructure is transmitted through the track roller frame assembly in a relatively symmetrical manner with respect to a longitudinal and central vertical plane extending through the track roller frame, and to the supporting roller wheels so as to reduce the overall stresses produced therein. Moreover, one of the embodiments of the track roller frame assembly of the present invention is pivotably secured to the vehicle main frame near one end, is connectable to an equalizer bar near the other end, and is constructed to releasably support a drive wheel while simultaneously transmitting the torque forces associated with powerably rotat-

BRIEF DESCRIPTION OF THE DRAWINGS

FIG. 2 is a diagrammatic and enlarged right side elevational view of the front portion of the undercarriage illustrated in FIG. 1 with a substantial part of the outer wheel portion removed and with the recoil mechanism shown broken open to better illustrate details thereof;

FIG. 3 is a diagrammatic and further enlarged cross sectional view through the front portion of the right hand undercarriage as taken along the line III—III of FIG. 2 and illustrating the pivot means for the track roller frame;

FIG. 4 is a diagrammatic and enlarged cross sectional view through the rear drive portion of the right hand undercarriage as taken along the line IV—IV of FIG. 1, with portions thereof shown in elevation for convenience;

FIG. 5 is a diagrammatic and enlarged top plan view of the rear portion of the right hand undercarriage as taken along the line V—V of FIG. 1 and with a portion broken away and in cross section to show details of the inside support device;

FIG. 6 is a diagrammatic, rear end view of the combine harvester illustrated in FIG. 1 showing the equalizer bar connection structure associated with the rear coupling means;

FIG. 7 is a diagrammatic right side elevational view of a combine harvester similar to FIG. 1, only showing a second embodiment of the track roller frame assembly constructed in accordance with the present invention;

FIG. 8 is a diagrammatic and enlarged fragmentary top plan view of the right rear wheel and associated suspension structure with portions thereof illustrated in cross section, and as taken generally along line VIII—VIII of FIG. 7;

FIG. 9 is a diagrammatic, enlarged, and fragmentary vertical cross section of the second embodiment track roller frame assembly as taken along line IX—IX of FIG. 7;

FIG. 10 is a side elevational view of the second embodiment track roller frame shown in FIGS. 7-9;

FIG. 11 is a top plan view of the track roller frame shown in FIG. 10;

FIG. 12 is a cross sectional view of the track roller frame as taken along line XII—XII of FIG. 10;

FIG. 13 is another cross sectional view of the track roller frame as taken along line XIII—XIII of FIG. 10;

FIG. 14 is a cross sectional view of a third embodiment track roller frame that can be compared with FIG. 12;

FIG. 15 is a diagrammatic, fragmentary, side elevational view of a fourth embodiment track roller frame;

FIG. 16 is a cross sectional view of the fourth embodiment track roller frame as taken along line XVI—XVI of FIG. 15; and FIG. 17 is another cross sectional view as taken along line XVII—XVII of FIG. 15.

BEST MODE FOR CARRYING OUT THE INVENTION

Figure 1:
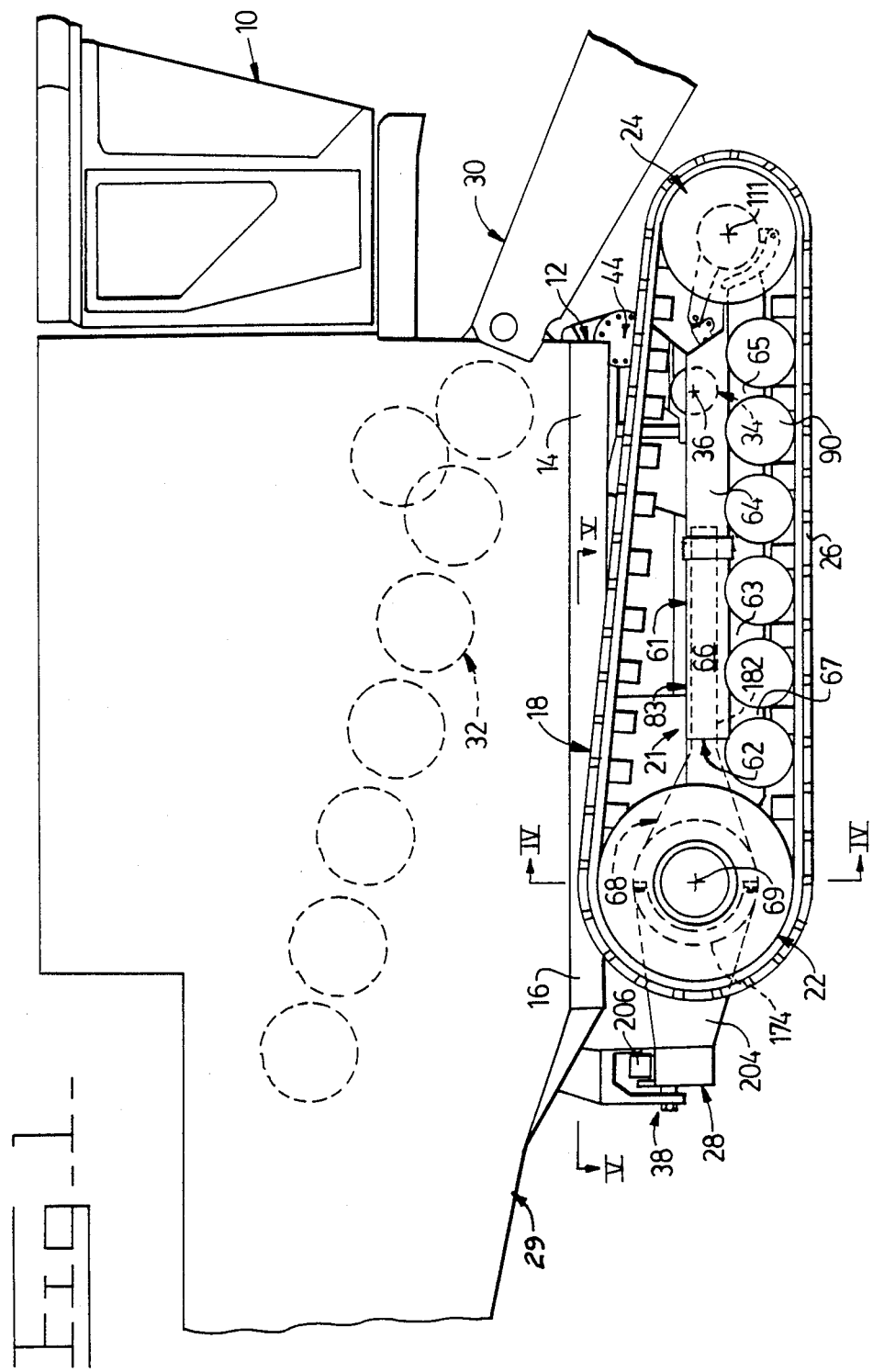
FIG. 1 is a diagrammatic right side elevational view of a combine harvester employing a track roller frame assembly for a tracked vehicle constructed in accordance with a first embodiment of the present invention, and illustrating only a portion of the harvesting implement mounted on the front thereof.

Referring to the first embodiment of FIG. 1, there is shown a combine harvester vehicle 10 having a longitudinally extending main frame 12 with a first end or front end 14 and a second end or rear end 16 located respectively to the right and left when viewing the drawing. Right and left hand track-type undercarriages 18 and 20 are located generally elevationally below the main frame and provide the sole support for the vehicle as is illustrated in FIG. 6. These undercarriages are essentially mirror images of each other, and each one includes a track roller frame assembly 21 having a rear drive wheel 22 and a front idler wheel 24, and a ground-engaging track or drive belt 26 that encircles these wheels in the form of an endless loop in a well-known manner. A suspension structure 28 used in conjunction with the undercarriages provides the support for the superstructure 29 of the combine harvester 10 and permits the harvesting of crops such as sugar cane, vegetables, rice and grains in predominantly soft and wet ground conditions. A conventional front-mounted harvesting implement 30, only a fragment of which is illustrated, is effective to gather the crop with forward movement of the vehicle and to urge it upwardly and rearwardly through the centrally located throat of a suitable threshing mechanism 32. It is to be understood that the harvesting mechanism itself could be of any suitable form, and that the depiction of the present invention within the context of a combine harvester is for purposes of example only, the invention also being adaptable to other forms of track-type or crawler vehicles.

Basically, the suspension structure 28 includes pivot means or a pair of laterally separated pivot joints 34 for pivotally connecting the undercarriages 18 and 20 supportably to the front end 14 of the main frame 12 and permitting pivotal movement of the track roller frame assemblies 21 about a common horizontal and transversely oriented pivot axis 36 as is illustrated best in FIGS. 2 and 3. The suspension structure further includes coupling means or a coupling assembly 38 for centrally supporting the rear end 16 of the main frame on the track roller frame assemblies, preventing uncontrolled lateral spreading of the undercarriages, and transferring side forces laterally between the undercarriages as is shown in FIGS. 5 and 6.

More specifically, the representative pivot joint 34 illustrated in FIGS. 2 and 3 includes a depending bracket 44 which is releasably secured to the front end 14 of the main frame 12. The bracket supports a pair of depending support blocks 45, with each block defining a downwardly facing semi-cylindrical internal surface or pocket 46. A pair of retention caps 47 are releasably secured to these blocks by a plurality of upwardly extending fasteners or bolts 48. Each of the retention caps defines an upwardly facing semi-cylindrical internal surface or pocket 49, so that the blocks and caps are adaptable to releasably clamp a stepped tubular housing 50 between them. The tubular housing has a raised rib 51 centrally therearound which is axially entrapped between the blocks and caps, and the tubular housing contains inboard and outboard sleeve bearings 52 and 53. A stepped and generally cylindrical stubshaft 54 which forms a part of each of the track roller frame assemblies 21 is supported for pivotal movement about the axis 36 in these sleeve bearings. An end retention cap 56 is provided which is releasably secured to the inner end of the stubshaft by one or more threaded fasteners or bolts 57 for restricting lateral motion therebetween. A cover 58 is releasably secured to the inner end of the tubular housing 50, and an annular seal ring 59 is disposed between the outer end of the tubular housing and the stubshaft for containing a lubricant within an enclosed chamber 60 defined thereby. Because the opposite pivot joints 34 are transversely separated, additional space is advantageously provided that can be utilized for greater ground clearance or for components mounted on the vehicle such as the centrally located throat of the threshing mechanism 32.

As is shown in FIGS. 1, 2 and 3, the right hand track roller frame assembly 21 includes a track roller frame 61 having an elongate main body 62 defined primarily by an elongate channel-shaped base or beam 63, a tubular casing 64 overlyingly connected to a front end portion 65 of the base, and reinforcing plate means or a transition plate structure 66 overlyingly connected to a rear end portion 67 of the base and defining therewith an enlarged tubular beam 83 having a structurally strong section modulus for its weight. The track roller frame also includes collar means 68 connected to the rear end of the main body 62 for supporting the rear drive wheel 22 for rotation about a horizontal and transversely oriented second axis 69. These major portions of the track roller frame are preferably weldably secured together and are generally arranged along a longitudinally oriented, vertical central plane 70 passing through a central axis 71 of the tubular casing 64.

A support bracket 72 is also rigidly secured to the inboard side of the tubular casing 64 by welding or the like, and preferably defines a flat, vertically oriented, inside mounting surface 73 parallel to the central plane 70. A mounting plate 74 integrally secured to the stubshaft 54 is releasably secured to the mounting surface 73 by a plurality of threaded fasteners or bolts 75. These fasteners are disposed generally about the periphery of the mounting plate and extend therethrough, and are screwthreadably received in the support bracket 72.

The first embodiment of the channel-shaped base 63 shown in FIG. 3 includes laterally inner and outer sidewalls 76 and 77, and upper and lower cross members 78 and 79 which are collectively welded together to form a relatively strong box beam in cross section. A plurality of transversely extending support pads 80 are suitably connected to the opposite sidewalls, and a stubshaft 81 defining a cylindrical surface 82 and a transverse central axis 84 is releasably secured to each one of these support pads by a plurality of threaded fasteners or bolts 86 screwthreadably received in the support pads. A roller wheel 90 is rotatably supported on each of the stubshafts by an opposed pair of tapered roller bearing assemblies identified generally by the reference number 96 and seated on the cylindrical surface 82. An end cap 98 is releasably secured to the roller wheel in covering relation to the end of the stubshaft, and an annular seal assembly 100 is located between the stubshaft and the roller wheel to contain lubricant therewithin and to exclude dirt or other foreign material therefrom.

FIG. 3 also illustrates a cross sectional view of the preferred endless track belt 26 which is defined by a relatively flat elastomeric body 104 having a plurality of inclined external ground-engaging bars 106 and a plurality of internal guide members 108 integrally formed therewith. The belt is preferably reinforced by internal cables or the like, not illustrated, so that it is substantially inextensible.

In order to apply proper tension to the track belt 26 and to allow obstacles in the path of the vehicle to be traversed with minimum shock to the undercarriage 18, the front idler wheel 24, including inner and outer wheel portions 109 and 110, is supported for rotation about a transverse horizontal axis 111 by a carrier 112 pivotally connected to the lower front end 65 of the track roller frame base 63 by a pivot pin 114. The carrier 112 is centrally disposed between the wheel portions and has a rearwardly and upwardly extending arm 116 which is connected to the front end of a connecting rod 118 via an adjustable length coupling link 120. The connecting rod is preferably resiliently urged to the right when viewing FIG. 2 by a resiliently loaded recoil mechanism 122 including a relatively large coiled compression spring 124. This rockable idler wheel assembly and associated recoil mechanism are of the general type disclosed in U.S. Pat. No. 3,899,218 issued to G. D. Blomstrom et al on Aug. 12, 1975, and assigned to the assignee of the present invention.

Referring now to FIGS. 4 and 5, each one of the track roller frame assemblies 21 includes a two speed or dual displacement hydraulic drive motor 126 for independently powerably rotating each of the rear wheels 22 along its respective transverse and horizontal axis 69. Each hydraulic drive motor is of the reversible radial piston type having a plurality of internal rollers that roll on a plurality of exterior cams as is known in the art, although not illustrated. Such motors are, for example, commercially produced by Poclain Hydraulics of France and are highly efficient in producing high torque either in a low speed range or a high speed range. In order to obtain the high range and to increase the output speed, the pressure supply to half the pistons is bypassed through a suitable control assembly, not illustrated.

More specifically, the hydraulic drive motor 126 includes a stationary and generally tubular housing 128, an internally splined motor output member 129, and an output shaft 130 releasably connected to the output member by an external spline 131. The output shaft is arranged to rotate along the transverse axis 69 on an opposed pair of tapered roller bearing assemblies 133, and rotates an annular mounting flange 132 connected thereto. An axially inner carrier member 134 of the rear wheel assembly 22 is releasably secured to the mounting flange 132 by a plurality of threaded fasteners or bolts 136. Also, an axially outer carrier member 138 is releasably secured to the inner carrier member 134 at a separation joint 140 by a plurality of threaded fasteners or bolts 142. An inner tapered roller bearing assembly 144 is seated on the inner carrier member, and an outer tapered roller bearing assembly 146 is seated on the outer carrier member in an opposed manner at either side of the separation joint. A support band 148 embraceably encircles these two juxtaposed bearing assemblies with a radially inwardly extending annular web 150 disposed between them for transmitting thrust loads from the wheel assembly 22 to the support band. An inner seal ring assembly 152 is disposed between the inner carrier member 134 and the support band 148, and an outer seal ring assembly 154 is disposed between the outer carrier member and the support band to define an enclosed compartment 156 for containing lubricant for the roller bearing assemblies and for excluding dirt and foreign material therefrom. A protecting cover 158 is releasably secured to the outer carrier member 138 by a plurality of fasteners or bolts 160. The wheel assembly 22 further includes an inner wheel portion 162 and an outer wheel portion 164 that are releasably and respectively secured to the inner carrier member 134 and outer carrier member 138 by pluralities of threaded fasteners 166 and 168. Note that the belt guide members 108 of the belt 26 are contained in side thrust transmitting relation between the wheel portions.

As shown by FIGS. 4 and 5, the outside collar means 68 includes a split-cap type collar 171. This collar includes a plate-like extension or base portion 172 of the track roller frame 61 which defines a rearwardly facing semi-cylindrical pocket 173, and a C-shaped retention cap 174 which defines a forwardly facing semi-cylindrical pocket 176. The cap 174 is releasably secured to the base portion 172 by a plurality of threaded fasteners or bolts 178. As is illustrated in FIG. 4, the support band 148 defines an outwardly facing peripheral recess 179, and the base portion 172 and the retention cap 174 are disposed within the recess and are effective to releasably secure the support band to the main body 62 of the track roller frame 61.

As shown in FIG. 5, the suspension structure 28 further includes an inside support device 180 having an elongate fabricated stabilizer beam or subframe 181 which has a front portion 182 of a box-shaped cross section releasably secured to the rear inside part of the track roller frame main body 62 by spaced apart threaded fasteners or bolts 184. Preferably, one or more relatively large cylindrical dowel pins 186 are secured to the track roller frame for initially positioning the stabilizer beam on the frame and to better transfer shear loads therebetween. A central portion 188 of the stabilizer beam is disposed in laterally inwardly offset relation to the front portion 182 by an inclined transition portion 190 located integrally therebetween of a box-shaped cross section. The central portion 188 defines a tubular opening 192 transversely therethrough and a plurality of inwardly facing threaded bores 194 located peripherally about the opening. An annular adapter plate 196 is releasably secured to the central portion 188 by a plurality of threaded fasteners or bolts 198 which extend therethrough and are screwthreadably received in the bores 194. A mounting flange 200 defined on the periphery of the motor housing 128 is also releasably secured to the adapter plate 196 by a second plurality of threaded fasteners or nut and bolt assemblies 202 located generally radially within the fasteners 198.

A rear portion 204 of the stabilizer beam 181 is also of a box-shaped cross section, and serves as a connection point for the rear coupling assembly 38 between the opposite track roller frames 61. As is shown in FIG. 6, the coupling means 38 includes an equalizer bar 206 mounted for pivotal movement about a longitudinal central axis 208 of the vehicle 10 by a pivot pin 210. An inverted saddle assembly or depending clevis 212 is integrally secured to the rear end 16 of the main frame 12 of the vehicle, and the ends of the pivot pin 210 are secured thereto in a normal manner. The equalizer bar is adapted to slide longitudinally a relatively limited distance on the pivot pin in order to accommodate to the oscillation of the opposite undercarriages. Thus, the equalizer bar can limitedly rotate about the axis 208 approximately 5° in either direction, and such travel distance is limited by a pair of depending stop members 213 secured to the bottom of the main frame 12. Each outer end 214 of the equalizer bar is releasably connected to the rear portion 204 of the stabilizer beam 181 by an outer coupling device or spherical coupling joint 216.

Referring to FIG. 4, each one of the hydraulic drive motors 126 includes a wet disc-type brake 236 operatively associated with the drive wheel 22. This brake is spring-engaged and hydraulically released, and acts through an inboard shaft 238 on the central axis 69 to retard or stop the rotational movement of the output member 129 conjointly secured thereto.

SECOND EMBODIMENT

A second embodiment combine harvester vehicle 10' is shown in FIG. 7 wherein the track roller frame assembly 21' differs from the first embodiment track roller frame assembly 21 by the simplification of the construction of the track roller frame 61', the relocation of the hydraulic drive motor 126' to an integrated position within the rear wheel 22', the modification and relocation of the outer coupling device 216' shown in FIG. 8 to the central axis 69' of the rear wheel, the live shaft construction of the roller wheels 90', and the simplification of the carrier 112' associated with the support of the front idler wheel 24'. In this regard, those elements similar to those described in connection with the first embodiment are identified by the same reference number with a prime indicator appended thereto.

One of the major features of the present invention is the lightweight, yet strong construction of the track roller frame 61' shown in FIGS. 10 though 13. In the second embodiment, the channel-shaped base 63' has a fully formed rectangular cross section as is shown in FIG. 12 from the rear end portion 67' forwardly to a cylindrical end plate 260 closing the rear portion of the tubular casing 64'. The plate means 66' includes a formed plate 261 having an inverted U-shaped cross section which is connected to the channel-shaped base by inner and outer longitudinally oriented weld joints 262 and 264 strategically located elevationally generally centrally of the overall depth of the main body 62' adjacent to the neutral bending plane thereof. The plate means 66' further includes a pair of tapered and convexly shaped bracing members 266 which are weldably secured to the sides of the formed plate 261 and to the end plate 260 for additional stiffness. Thus it can be appreciated from viewing FIG. 12 that the plate means 66' and the base 63' collectively form an enlarged tubular beam 83' of substantial elevational depth or height "h" adjacent the end plate 260. Moreover, as shown in FIGS. 10 and 11 the plate means 66' and base 63' collectively form a forwardly facing back-up shoulder 267 for the end plate and the tubular casing 64' that strengthens the main body 62' and better resists the longitudinal forces associated with any conventional recoil mechanism 122' located within the tubular casing, although not illustrated. Forwardly of the end plate 260, an upper longitudinal slot 268 is formed through the top plate member 78' of the channel-shaped base 63' as can be noted by reference to FIGS. 12 and 13 in order to nestably receive the tubular casing 64'. Inner and outer weld joints 270 and 272, which are substantially colinear with the weld joints 262 and 264 respectively, connect the casing to the base. An access opening 274 is formed radially through the casing, an annular mounting flange 276 is connected to the casing thereat, and a cover plate 278 is releasably secured to the mounting flange to permit service access to any recoil mechanism 122' disposed within the casing. As is illustrated only partially in FIGS. 7, 10 and 11, a pair of diametrically opposite twist prevention devices 280 and 282 of conventional construction are provided which extend radially into the casing to maintain a preselected angular orientation of the carrier 112' about the central axis 71' of the tubular casing 64'. And at the forward end of the casing the pivot pin support bracket 72' and a bearing and seal supporting ring 284 are weldably secured to the casing. Preferably, a closure plate 285 is weldably secured to the ring and the front face of the base.

A plurality of longitudinally spaced apart mounting pads 286 are weldably secured to the bottom surface of the channel-shaped base 63', and as shown best in FIG. 9 a formed tubular casing 288 is releasably secured to each pad by a plurality of upwardly extending threaded fasteners or bolts 290. Each of the roller wheels 90' includes an inboard wheel portion 292 and an outboard wheel portion 294 interconnected by a live cross shaft 296, and a pair of laterally spaced bearings 298 and 300 are seated within the tubular casing for rotatably supporting the cross shaft. This view also illustrates the relationship of the relatively narrow width "b" of the channel-shaped base 63' to the clearance "w" between the wheel portions 292 and 294.

As is shown by FIG. 7, the front idler wheel 24' is cantileverably supported for rotation about its transverse axis 111' by the carrier 112' which in this instance is directly telescopically received in the tubular casing 64', as well as being centrally disposed between the wheel portions 109' and 110'. Like the first embodiment, the carrier is preferably continually urged to the right when reviewing FIG. 7 in a direction away from the rear wheel 22' by any conventional recoil mechanism 122', not shown.

Referring now to FIG. 8, the rear wheel 22' of the track roller frame assembly 21' includes a generally tubular housing 304, and a shaft assembly 306 rotatably supported therewithin. And, the collar means 68' includes an annular supporting collar 308 which is preferably rigidly secured to the main body 62' of the track roller frame 61' by a weld joint 310 at the front face of the collar as can also be appreciated by reference to FIGS. 7, 10 and 11. The supporting collar has an internal mounting flange 312 which defines a cylindrical pilot bore or opening 314 therethrough generally concentrically arranged with the second axis 69', and a plurality of cylindrical passages 316 therethrough. In a cooperating manner the housing 304 has an external mounting flange 318 defining a plurality of cylindrical passages 320 therethrough, and an external cylindrical pilot portion 322 which is insertable in the pilot bore 314. A plurality of fluted studs 324 are rigidly secured in the passages 320 of the mounting flange 318 which extend laterally outwardly through the passages 316, and a plurality of retaining nuts 326 are screwthreadably installed thereon in order to releasably couple the housing 304 to the collar 308.

The shaft assembly 306 is rotatably supported within the housing 304 by an inboard tapered roller bearing 328 and an outboard tapered roller bearing 330 laterally spaced symmetrically on each side of the central plane 70'. The shaft assembly includes an output shaft 332 defining a cylindrical inner end portion 334 and an inboard flange member 336, and an outboard flange member 338 is releasably and nonrotatably secured to the shaft by a conventional retention device 340. FIG. 8 also shows that the wheel 22' has inner and outer wheel portions 162' and 164' which are releasably secured to the flange members 336 and 338 respectively.

Although not illustrated in FIG. 8 the internally located hydraulic drive motor 126' for powerably rotating the shaft assembly 306 is advantageously radially disposed within the wheel housing 304 and axially between the flange members 336 and 338 and/or wheel portions 162' and 164'. The auxiliary disc-type parking brake 236' is also advantageously included within the housing.

The outer coupling device 216' shown in FIG. 8 differs from the first embodiment by connecting the bifurcated outer end 214' of the equalizer bar 206' to the rear wheel 22' along the transverse axis 69' More specifically, the outer coupling device 216' is constructed for universal connection to the rotatable shaft 332 and includes a pair of tapered roller bearings 342 which are internally seated in an opposing relation on the cylindrical inner end portion 334 of the shaft, and which are secured in place by a releasable thrust-transmitting retaining plate 344. These roller bearings are seated within a cylindrical bore 346 of an annular trunnion member 348, and individually engage a thrust ring 350 located between them. The trunnion member supports a pair of oppositely extending pivot pins 352 arranged along a generally horizontal common axis 354 disposed in a longitudinally oriented vertical plane. Aligned cylindrical bores 356 formed in the outer end 214' of the equalizer bar are adapted to receive sleeve or needle bearings 358, and these bearing rotatably receive these pins. The axis 354 of the pivot pins intersects the transverse axis 69'.

THIRD EMBODIMENT

As is illustrated in FIG. 14, a third embodiment of the tubular beam 83" is shown as including a channel-shaped base 63" consisting essentially of a formed plate 360 of U-shaped cross section, and upper plate means 66" including a formed plate 362 of U-shaped cross section and a top plate 364.

FOURTH EMBODIMENT

A fourth embodiment roller frame main body 62''' is partially illustrated in FIGS. 15–17, and includes a channel-shaped base 63''' primarily formed by a first or inboard side plate 366 and a second or outboard side plate 368 interconnected by a longitudinally oriented, central weld joint 370 at the bottom thereof. In this instance, the plate means 66''' overlyingly connected to the rear portion of the base 63''' includes the integrally formed upper portions of both side plates which are generally of a C-shaped cross section. A longitudinally oriented, central weld joint 372 secures the side plates together at the upper part thereof, and the plate means 66''' further includes cross bracing means 374 between the side plates for structurally strengthening the main body 62'''. Specifically, the cross bracing means includes an elongate channel member 376 of U-shaped section which spans laterally between the side plates and is connected thereto by a plurality of annular or plug-type weld joints 378 as shown in FIG. 15. Each of the side plates 366 and 368 is formed to define a forwardly facing back-up shoulder 267''', an upwardly facing casing support edge 380, and a profiled slot 382 that receives a ¼ round cross piece 384 having a cross section equivalent to one-fourth of a cylindrical rod. The channel member 376 is seated on the cross piece 384, and the rounded profile of the shaped cross piece tends to minimize internal stresses at the intersection of the shoulder and the supporting edges caused by bending of the main body of the track roller frame assembly 21''' in use.

INDUSTRIAL APPLICABILITY

In operation, the vehicle 10 is driven by the operator in such a way that the output shafts 130 of the hydraulic drive motors 126 shown in FIG. 4, or the shaft assemblies 306 shown in FIG. 8, can be independently and selectively driven at any ground speed within a low working speed range or at an expanded traveling speed range with a relatively higher maximum rate of speed. A suitable control apparatus, not illustrated, can selectively and proportionately cause more flow to one of the hydraulic drive motors 126 and less flow to the opposite hydraulic drive motor so that the vehicle can be controllably steered in the desired direction. Since one hydraulic drive motor can be locked or even controllably reversed in rotational direction while the opposite one is rotating in the forward direction, a compact pivot turn of the combine harvester can be easily achieved. Also, at any time the disc type brakes 236 may be simultaneously applied by the vehicle operator to slow down or to brake the vehicle. Of course, the hydraulic drive motors can be individually hydrostatically braked as is known in the art for providing the usual service braking function.

When the vehicle 10 travels over uneven terrain, for example, the rearward end of the right track roller frame assembly 21 may swing downwardly about the front pivot axis 36 while the rearward end of the left track roller frame assembly swings upwardly about the same front pivot axis due to their common connection to the centrally pivoted equalizer bar 206 as can be appreciated by reference to FIGS. 1 and 6. As the track roller frame assemblies move in opposite directions, the equalizer bar will swing about the pivot pin 210 and cause the spherical coupling joints 216 to travel in arcuate paths about the axis 208. But since the equalizer bar travels through only a limited angular range, the amount of relative travel between the internal members of the spherical coupling joint 216 is minimal and the amount of laterally inward movement of each of the track roller frame assemblies above and below the horizontal level is also minimal.

In regard to the second embodiment outer coupling device 216' shown in FIG. 8, the left and right pivot pins 352 will also travel in slightly arcuate paths about the central axis 208 when the track roller frame assemblies 21' pivot about the axis 36' and as viewed from the rear of the vehicle 10 as can be appreciated by reference to FIG. 6. And yet the transverse axis 69', which advantageously is at the same elevation as the longitudinally oriented central axis 208 of the equalizer bar 206', will remain parallel to the front pivot axis 36'.

The wheel or motor housing 304 shown in FIG. 8 is laterally centrally mounted on the track roller frame 61', and the hydraulic drive motor 126' is disposed radially therewithin in a protected location laterally within the inner and outer wheel portions 62' and 164', and generally within the width envelope of the drive belt 26'. Thus the hydraulic drive motor is less susceptible to possible damage and there is less debris build-up than in the first embodiment of FIG. 4. The tension loads on the drive belt due to the carrier 112' being urged forwardly or to the right when reviewing FIG. 7 in a continuously resilient manner by the recoil mechanism 122' are directed relatively evenly or symmetrically through the inner and outer wheel portions and to the shaft assembly 306. Thereafter such forces are directed through the laterally separated inner and outer roller bearings 328 and 330 to the housing 304, and to the central mounting flange 318 in two relatively equivalent force transmitting paths to the supporting collar 68'. Note specifically that the housing mounting flange 318 is on the central plane 70' of the track roller frame assembly 21' so that the torque loads due to the hydraulic drive motor are also substantially directly directed thereto along this plane. The recoil mechanism 122' also acts along the central axis 71' of the tubular casing 64' to urge the carrier 112' forwardly to provide the desired tension to the drive belt 26 on the wheels 22' and 24' for solely frictional engagement with the wheel portions 109', 110', 162' and 164'. These belt tension loads are transferred to the tubular casing 64', the transition structure 66', the channel-shaped base 63', and to this supporting collar 68' symmetrically along the central plane 70' as can be visualized by reference to FIGS. 7-13.

By the term "channel-shaped base" 63 it is meant that at least one bottom plate and two side plates are provided to define a U-shaped portion in cross section, and the upper part thereof can, in effect, optionally be provided with a separate top plate as shown in FIGS. 14 and 16 or be integrally formed with the side plates as shown in FIG. 12 to define a rectangular beam in cross section. Alternately, the bracing means 374 of FIG. 16 can be a plurality of cross pieces spaced longitudinally between the sideplates, although not illustrated, so that the channel shaped base is internally in open communication with the upper plate means 66''' that completes the cross section into the tubular beam 83'''.

The track roller frame 61, front and rear wheel assemblies 24 and 22, the track belt 26, and the hydraulic drive motors 126 at one side of the vehicle 10 can be very simply removed as a unit from the main frame 12. It is only necessary to place a support such as an adjustable jack, not illustrated, under the front end 14 of the main frame to enable the pivot joint 34 shown in FIG. 3 to be uncoupled. Fasteners 48 are screwthreadably released to allow the lower retention caps 47 to be disconnected from the upper support blocks 45. Another support, not illustrated, can be placed under the rear end 16 of the main frame 12 to permit the spherical coupling joint 216 to be uncoupled. With the disassembly of any hydraulic and/or electric lines, this frees the entire undercarriage 18 from the main frame.

Alternatively, the hydraulic drive motor 126 can be uncoupled for servicing as a unit without removal of the track roller frame 61 or the stabilizing beam 181 from the vehicle 10, and without propping up the main frame 12. In such an instance, the fasteners 198 shown in FIG. 5 are screwthreadably removed from the stabilizing beam 181 to free the adapter plate 196 therefrom, and the fasteners 136 shown in FIG. 4 are screwthreadably removed from the inner carrier member 134 to free the mounting flange 132 from the wheel assembly 22. When the hydraulic and electrical lines, not shown, are also uncoupled in a normal manner, these components can be moved laterally inwardly along axis 69 so that the housing 128, output shaft 130 and mounting flange 132 can be separated from the drive wheel assembly 22 and the equalizer beam 181.

In view of the foregoing, it is apparent that the track roller frame assemblies 21 of the present invention are rugged in construction and very economical to manufacture due to the relatively limited number of major portions thereof, the relatively limited length of connecting weld joints, and the location and simplicity of the weld joints. Moreover, the forces transmitted longitudinally along the full length of the track roller frame assemblies are directed generally along the central plane 70, and the weight loads of the superstructure are transmitted through the channel-shaped base 63 and to the supporting wheels 22, 24 and 90 along the central plane so that the construction is symmetrically loaded and capable of being made of rollably formed steel materials which are very economical to manufacture.

Preferably, the tubular beams 83 are of substantially rectangular cross section and have a height "h" equal to approximately two to three times the width "b" to provide the desired section modulus. And while the lower channel-shaped base 63 and the upper reinforcing or transition plate means 66 are shown as including at least two major rollably formed steel plates which are welded together in the embodiments of FIGS. 12, 14 and 16, it is further contemplated that the main body 62 exclusive of the tubular casing 64 can also be of an integrally cast steel construction without departing from the spirit of the present invention.

Other aspects, objects and advantages of this invention can be obtained from a study of the drawings, the disclosures and the appended claims.

We claim:

1. A track roller frame assembly of the type adapted to be connected to a vehicle main frame and adapted to be supported by a plurality of roller wheels, comprising:
    a main body including an elongate channel-shaped base supported by the roller wheels when in use and having first and second end portions, a tubular casing overlyingly connected to the first end portion, and plate means overlyingly connected to the second end portion of the channel-shaped base for forming a tubular beam of increased elevational depth in cross section thereat and a back-up shoulder for strengthening connection with the tubular casing; and
    a collar connected to the tubular beam of the main body and defining a transverse opening therethrough.

2. The track roller frame assembly of claim 1 wherein the main body includes support means connected to the tubular casing and adapted for pivotal connection of the elongate main body to the main frame.

3. The track roller frame assembly of claim 1 wherein the second end portion of the channel-shaped base is of formed tubular rectangular cross section.

4. The track roller frame assembly of claim 3 wherein the first end portion of the channel-shaped base defines an upper longitudinal slot for nestably receiving the tubular casing therein.

5. The track roller frame assembly of claim 3 wherein the plate means includes a forward plate having a generally inverted U-shaped cross section.

6. The track roller frame assembly of claim 5 wherein the main body includes a cylindrical end plate connected between the tubular casing and the back-up shoulder of the plate means.

7. The track roller frame assembly of claim 6 wherein the plate means includes a pair of convexly shaped bracing members connected to the formed plate and the end plate.

8. The track roller frame assembly of claim 1 wherein the main body includes a plurality of roller wheel mounting pads secured to the bottom surface of the channel-shaped base.

9. The track roller frame assembly of claim 1 wherein the collar includes a base portion defining a semi-cylindrical pocket, and a cap portion defining a semi-cylindrical pocket releasably secured to the base portion such that the pockets collectively define the opening.

10. The track roller frame assembly of claim 1 wherein the tubular casing has a central axis and a longitudinally oriented, vertical central plane passing through the central axis, and the collar defines an internal mounting flange located substantially on the central plane.

11. The track roller frame assembly of claim 1 wherein the first end portion of the channel-shaped base is of a box beam cross section as defined by inner and outer sidewalls and upper and lower cross members connected together.

12. The track roller frame assembly of claim 11 wherein the main body includes transversely extending shaft means for rotatably supporting the roller wheels on the sidewalls of the base.

13. The track roller frame assembly of claim 1 wherein the tubular beam is generally rectangular and has a height "h" equal to approximately two to three times the width "b".

14. The track roller frame assembly of claim 13 wherein the channel-shaped base includes a first U-shaped plate, and the plate means includes a second U-shaped plate and a top plate.

15. The track roller frame assembly of claim 13 wherein the tubular beam includes inboard and outboard side plates of generally C-shaped cross section.

16. The track roller frame assembly of claim 15 wherein the tubular beam includes cross bracing means structurally interconnecting the side plates for strengthening the main body.

17. A track roller frame assembly of the type adapted to be connected to a vehicle main frame and adapted to be supported by a plurality of roller wheels, comprising:
    a main body including an elongate channel-shaped base supported by the roller wheels when in use and having first and second end portions, a tubular casing overlyingly connected to the first end portion, and a transition plate structure overlyingly connected to the second end portion; and
    a wheel-supporting collar connected to the main body of the second end portion of the base and defining a bore therethrough.

18. The track roller frame assembly of claim 17 wherein the channel-shaped base and the transition plate structure collectively define a tubular beam of generally rectangular cross section.

19. The track roller frame assembly of claim 18 wherein the tubular beam has a height "h" equal to approximately two to three times the width "b".

20. The track roller frame assembly of claim 17 wherein the transition plate structure includes a cylindrical end plate and defines a back-up shoulder, the cylindrical end plate being engaged between the shoulder and the tubular casing.

21. The track roller frame assembly of claim 17 wherein the channel-shaped base includes at least one bottom plate and two side plates defining a U-shape in cross section.

22. The track roller frame assembly of claim 17 wherein the main body includes support means for pivotal connection of the main body to the main frame longitudinally away from the collar.

23. The track roller frame assembly of claim 22 wherein the wheel-supporting collar is adapted to support a tubular housing within the bore thereof, and a hydraulic drive motor within the tubular housing.

* * * * *